UNITED STATES PATENT OFFICE.

THOMAS LEOPOLD WILLSON AND MAXIMILIAN MATTHEUS HAFF, OF OTTAWA, ONTARIO, CANADA, ASSIGNORS, BY DIRECT AND MESNE ASSIGNMENTS, TO SOUTHERN INVESTMENT CO. OF CANADA LTD., OF MONTREAL, CANADA, A CORPORATION OF CANADA.

FERTILIZER COMPOSITION AND PROCESS OF MAKING IT.

1,145,107.  Specification of Letters Patent.  Patented July 6, 1915.

No Drawing.    Application filed August 18, 1913.  Serial No. 785,268.

*To all whom it may concern:*

Be it known that we, THOMAS LEOPOLD WILLSON and MAXIMILIAN MATTHEUS HAFF, both subjects of the King of Great Britain, and residents of the city of Ottawa, Province of Ontario, Dominion of Canada, have invented certain new and useful Improvements in Fertilizer Composition and Process of Making It, of which the following is the specification.

This invention relates to improved fertilizers and the objects of the invention are to produce a dry phosphate and potash fertilizer having a suitable amount of ammonia combined therein.

In an application of even date herewith Serial Number 785,269, we have described the process by which a dry double superphosphate may be manufactured with potash, the essential feature of which process comprises manufacturing the double superphosphate with pyrophosphoric acid and introducing the potash into the acid solution, or producing it in the acid solution by heating feldspar with phosphatic material in the electric furnace to vaporize phosphoric acid and potash.

According to the present invention, the dry double superphosphate with potash therein, produced by the process just described, is ammoniated by introducing ammonia in the form of gas, which ammonia will combine with the monocalcic phosphate and potash to produce a valuable fertilizer.

The ammonia is introduced in quantities greater than would be sufficient to only neutralize the free acid in the superphosphate product. Usually ten to fifteen per cent. of ammonia as vapor will be sufficient.

As explained in our application of even date, the double superphosphate produced when pyrophosphoric acid is used sets in the manner of plaster, and therefore it is naturally dry and may be termed "set."

What we claim as our invention is:

1. The herein described process which comprises adding phosphoric acid and potash to phosphate rock to produce a superphosphate with potash, then introducing ammonia gas into the mixture in quantities greater than would be sufficient to only neutralize the free acid therein.

2. As a new article of manufacture, a substantially dry fertilizer composition comprising potash and naturally dry double superphosphate having ammonia combined therein and containing no free acid.

In witness whereof we have hereunto set our hands in the presence of two witnesses.

THOMAS LEOPOLD WILLSON.
MAXIMILIAN MATTHEUS HAFF.

Witnesses:
 RUSSEL B. SMART,
 D. C. A. RAYE.